United States Patent
Chen et al.

(10) Patent No.: US 8,478,236 B2
(45) Date of Patent: Jul. 2, 2013

(54) USER PROFILE BASED CONTENT DELIVERY BETWEEN A STANDARD HANDSET AND A FEMTOCELL DEVICE

(75) Inventors: Xuemin (Sherman) Chen, San Diego, CA (US); Charles Abraham, Los Gatos, CA (US); Wael William Diab, San Francisco, CA (US); Vinko Erceg, Cardiff, CA (US); Victor T. Hou, La Jolla, CA (US); Jeyhan Karaoguz, Irvine, CA (US); Mark Kent, Vista, CA (US)

(73) Assignee: Broadcom Corporation, Irvine, CA (US)

( * ) Notice: Subject to any disclaimer, the term of this patent is extended or adjusted under 35 U.S.C. 154(b) by 945 days.

(21) Appl. No.: 12/355,598

(22) Filed: Jan. 16, 2009

(65) Prior Publication Data
US 2010/0184405 A1    Jul. 22, 2010

(51) Int. Cl.
*H04L 29/08* (2006.01)

(52) U.S. Cl.
USPC ............... 455/410; 455/414.4; 455/435.1

(58) Field of Classification Search
USPC ................... 455/410, 414.4, 435.1
See application file for complete search history.

(56) References Cited

U.S. PATENT DOCUMENTS

| | | | |
|---|---|---|---|
| 7,913,273 B2 * | 3/2011 | Del Beccaro et al. | 725/31 |
| 2007/0032225 A1 * | 2/2007 | Konicek et al. | 455/417 |
| 2008/0207170 A1 * | 8/2008 | Khetawat et al. | 455/411 |
| 2008/0216145 A1 * | 9/2008 | Barton et al. | 725/131 |
| 2010/0184411 A1 * | 7/2010 | Chen et al. | 455/414.1 |

* cited by examiner

*Primary Examiner* — Ajit Patel
*Assistant Examiner* — Julio Perez
(74) *Attorney, Agent, or Firm* — Sterne, Kessler, Goldstein & Fox P.L.L.C.

(57) ABSTRACT

An access device receives content from a broadband IP network to be communicated to a wireless handset over a radio access network (RAN). The access device acquires a user profile utilized in the radio network for the wireless handset. Based on the acquired user profile, the access device determines transmission parameters utilized for communicating the received content to the wireless handset using an air interface protocol over the radio access network. A security level and/or a security protocol, a transcoding mechanism, and/or transmission bit rate are determined based on the acquired user profile. A resolution, transmission bit rate, coding structure, security protocol and/or security level for transmitting the received content to the wireless handset are adjusted based on the acquired user profile. Alternately, the access device is enabled to receive content from the wireless handset using a transmission profile determined based on user profile of the wireless handset.

27 Claims, 6 Drawing Sheets

USER PROFILE BASED CONTENT DELIVERY BETWEEN A STANDARD HANDSET AND A FEMTOCELL DEVICE

CROSS-REFERENCE TO RELATED APPLICATIONS/INCORPORATION BY REFERENCE

Not applicable.

FIELD OF THE INVENTION

Certain embodiments of the invention relate to communication systems. More specifically, certain embodiments of the invention relate to a method and system for a user profile based content delivery between a standard handset and a Femtocell device.

BACKGROUND OF THE INVENTION

The adoptions of wireless networks such as 3GPP, 3GPP2, and WiMAX have been accelerating over the past few years. Various wireless services have been provided via the wireless networks to enable consumers to experience excellent voice quality and a wide array of compelling data services. At the same time, residential broadband-access penetration has been rising quickly with the proliferation of DSL and cable modems, and as a result, fixed-mobile convergence (FMC) is gaining momentum in the marketplace.

The development of Femtocells aims to combine fixed-line broadband access with wireless telephony to extend carriers' wireless networks directly into the homes. A Femtocell is a very small wireless access device residing in a consumer's home. Femtocells leverage the existing Internet Protocol (IP) broadband links (such as DSL or cable) to backhaul various mobile services such as, for example, voice, video, SMS, and data traffic, from the home. Femtocells are designed to integrate with an existing wireless network and to work seamlessly with existing wireless handsets. Femtocells provide excellent coverage in indoor environments and enables operators to address new markets.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for a user profile based content delivery between a standard handset and a Femtocell device, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a user profile based content delivery between a standard handset and a Femtocell device. In accordance with various embodiments of the invention, an access device may receive content from a broadband IP network to be communicated with a wireless handset associated with a radio access network. The access device may acquire a user profile to determine a security level and/or a security protocol. The acquired user profile may be utilized to communicate the received content from the access device to the wireless handset via using an air interface protocol over the radio access network. The access device may be enabled to identify the wireless handset by, for example, decoding a destination ID parameter in packet headers of the received content. The access device may be enabled to acquire the user profile of the wireless handset based on the identified wireless handset. Based on the acquired user profile, the access device may be enabled to determine a security level and/or a security protocol for content protection. The access device may enable content transcoding on the received content based on the acquired user profile. A resolution, a color depth, a frame rate, a compression level, and sample rate of the received content may be modified via transcoding based on the acquired user profile. The transcoded received content may be communicated, for example, in a coding structure such as IIII, IPPP, and/or IBBPBBP to the wireless handset using the determined security protocols and/or the determined security level. The acquired user profile may comprise a terminal power report from associated wireless devices served. The terminal power report may comprise power consumption, power remaining, power available, processes running and their power consumption, past power usage, and/or predicted power usage at the wireless handset. The power consumption condition at the wireless handset may indicate a desired transmission bit rate and/or a reduced transmission bit rate for communicating the received content to the wireless handset. The access device may be enabled to determine whether, for example, the desired transmission bit rate, the reduced transmission bit rate, or other parameters may be utilized for content delivery to the wireless handset based on the power consumption condition, and/or remaining power that is available at the wireless handset.

In another embodiment of the invention, the Femtocell device may be enabled to receive content from the wireless handset. In this regard, the Femtocell device may be enabled to determine a transmission profile utilized for content transmission to the Femtocell device from the wireless handset by evaluating user profile of the wireless handset. The determined transmission profile may comprise a transmission bit rate and/or a coding structure such as IIII, IPPP, or IBBPBBP.

Figure 1:
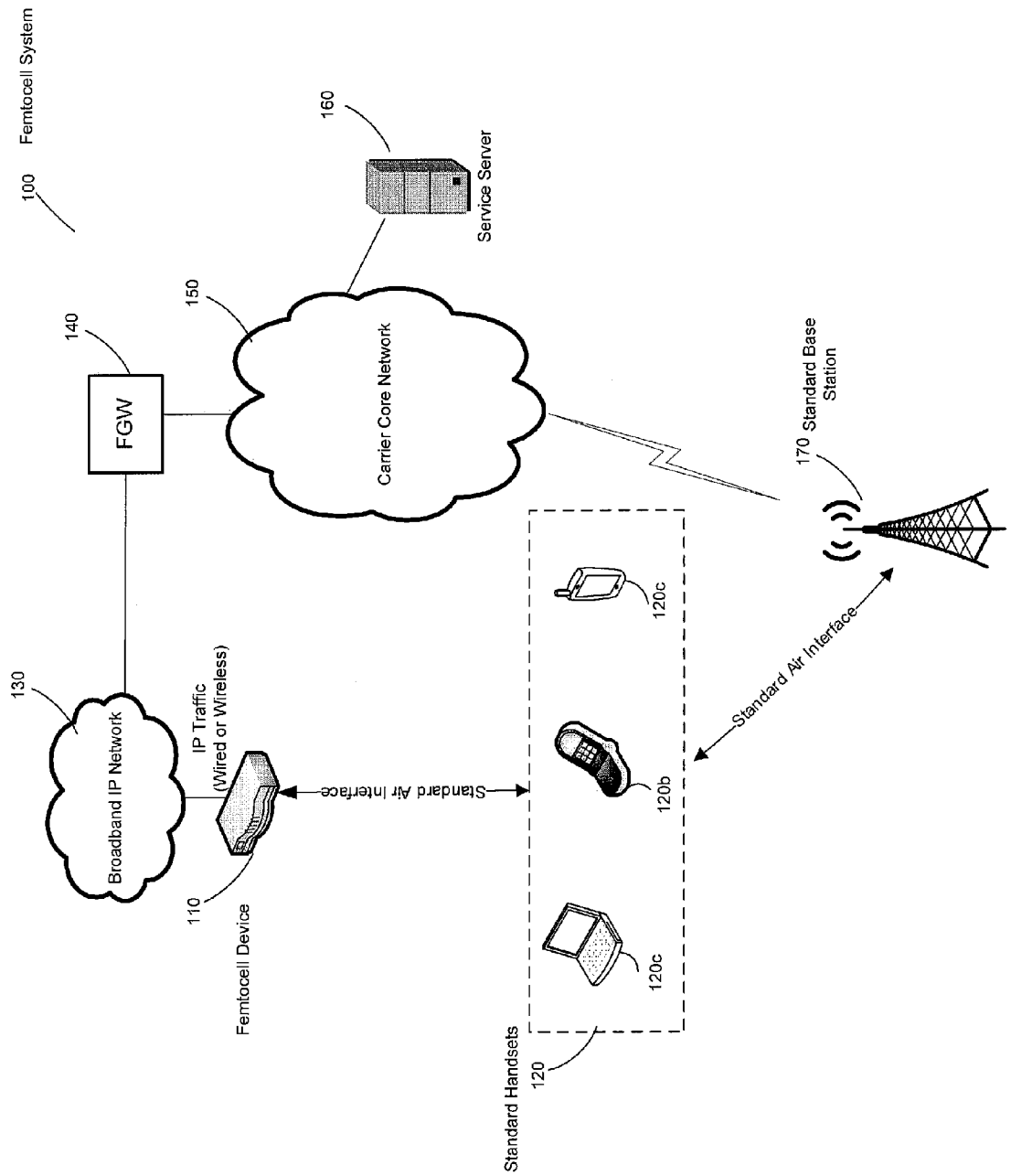
FIG. 1 is a diagram illustrating an exemplary Femtocell system that enables a user profile based content delivery to a standard handset via a Femtocell device, in accordance with an embodiment of the invention.

FIG. 1 is a diagram illustrating an exemplary Femtocell system that enables a user profile based content delivery to a standard handset via a Femtocell device, in accordance with an embodiment of the invention. Referring to FIG. 1, there is shown a Femtocell system 100 comprising a Femtocell device 110, a plurality of standard handsets 120, of which a notebook computer 120a, a cell phone 120b, and a smart phone 120c are displayed, a broadband IP network 130, a Femtocell gateway (FGW) 140, a carrier core network 150, a service server 160, and a standard base station 170.

The Femtocell device 110 may comprise suitable logic, circuitry, and/or code that may be operable to communicate wirelessly with the plurality of standard handsets 120 utilizing one or more industry telecommunication standards such as 3GPP, 3GPP2, WiMAX, extensions thereto, and/or variants thereof. The Femtocell device 110 may be configured to support various standard-based handsets such as, for example, 3GPP-based handsets and 3GPP2-based handsets. In addition, the Femtocell device 110 may be operable to communicate with the carrier core network 150 via the broadband IP network 130 for various services provided by the service server 160.

The Femtocell device 110 may be enabled to duplicate the functionality of a standard macro base station such as the standard base station 170. For example, the Femtocell device 110 may be configured to establish connections and associated sessions with served standard handsets using a particular air interface specified in, for example, 3GPP, 3GPP2, and/or WiMAX. The Femtocell device 110 may be enabled to assign air-interface resources, perform scheduling, and/or maintaining various established connections.

The Femtocell device 110 may be integrated to the existing wireless networks to work seamlessly with existing standard handsets such as 3GPP-based handsets. For example, the Femtocell device 110 may be integrated with, for example, a UMTS-based satellite set-top-box (STB). Both point-to-point and point-to-multipoint communications may be supported by the Femtocell device 110. The Femtocell device 110 may have a wired or wireless connection with the broadband IP network 130 to provide IP backhaul for the Femtocell device 110. The Femtocell device 110 may be enabled to manage communication of content associated with a particular service from the service server 160 to a standard handset such as the cell phone 120b. The Femtocell device 110 may be configured to customize and/or reformat received content associated with the particular service based on a user profile of the cell phone 120b. The customized and/or reformatted received content may be delivered to the cell phone 120b using a standard air interface protocol such as 3GPP or 3GPP2. In this regard, the Femtocell device 110 may be enabled to reformat the content associated with the particular service received via the broadband IP network 130 in a form suitable for presentation to the particular service to users of the cell phone 120b. The Femtocell device 110 may be enabled to utilize associated user profile of the cell phone 120b for content delivery. For example, in order to deliver the content associated with the particular service to the cell phone 120b, the Femtocell device 110 may be enabled to determine and/or apply a security level and a secure processing method for content protection, perform content transcoding, and/or adjust a content delivery bit rate based on the user profile of the cell phone 120b.

The standard handsets 120 such as the cell phone 120b may comprise suitable logic circuitry and/or code that may be enabled to receive and/or transmit radio frequency signals from and/or to various Femtocell devices such as the Femtocell device 110 and various standard macro base stations such as the standard base station 170. The cell phone 120b may be associated with a radio access network (RAN) in a mobile telecommunication system such as, for example, 3GPP, 3GPP2, or WiMAX. A radio access technology or an air interface may be defined specifically for a particular RAN. A RAN may comprise geographically dispersed base stations and radio network controllers (RNC). The RNCs may be operable to manage associated base stations within the corresponding served RANs. An air interface is referred to the radio-frequency (RF) portion of the transmission path between various wireless mobile such as the cell phone 120b and active base stations such as the standard base station 170. Communications between associated mobile devices and active base stations may be implemented via an air interface protocol specifically defined for an associated RAN. In this regard, once being authorized, the cell phone 120b may be enabled to access various voice and data services provided by the carrier core network 150 via the broadband IP network 130. The cell phone 120b may be enabled to communicate with the Femtocell device 110 for the provided service using a standard air interface protocol. The standard air interface protocol may be defined for a RAN associated with the cell phone 120b and the standard base station 170. Exemplary air interfaces may comprise CDMA, GSM, UMTS, and WiMax.

The broadband IP network 130 may comprise suitable logic circuitry and/or code that may enable distribution of content associated with various services using Internet protocols (IP). The broadband IP network 130 may deliver a variety of services over broadband to users efficiently and cost-effectively. The broadband IP network 130 may be enabled to access to the Internet and/or one or more carrier core networks such as the carrier core network 150. The broadband IP network 130 may provide broadband IP connections to enable various Femtocell devices such as the Femtocell device 110 to communicate various IP traffic with, for example, the PSTN and/or other wired or wireless devices, via the carrier core network 150. The broadband IP connections may comprise, for example, a digital subscriber line (DSL), a T1/E1 line, the cable television infrastructure, the satellite television infrastructure, and/or a satellite broadband internet connection. The IP traffic over the broadband IP connections may be communicated with the carrier core network 150 via the FGW 140.

The FGW 140 may comprise suitable logic circuitry and/or code that may enable protecting the integrity of operators' core networks such as the carrier core network 150 from the public environment of the Internet, protecting the integrity of users' traffic, and supporting seamless transitions between the macro and Femtocell networks. The FGW 140 may communicatively couple various Femtocell devices such as the Femtocell device 110 to the carrier core network 150. The FGW 140 may be configured to communicate with the carrier core network 150 using a radio network controller interface. For example, for a UMTS-based Femtocell device, the FGW 140 may apply a UTRAN Iu-cs interface for circuit switched voice services and a UTRAN Iu-ps interface for packet data services such as GPRS. In this manner, the FGW 140 may appear to a UTRAN core network as a traditional UTRAN network element such as, for example, a radio network controller (RNC) and may be managed and operated as such.

The carrier core network 150 may comprise suitable logic circuitry and/or code that may enable providing reliable transfer of information and connections between exemplary entities comprising content providers, service providers and access networks. The carrier core network 150 may provide various network related control functions for addressing, establishing, and releasing of connections and network management functions. The network management functions may comprise various signaling for network configurations, performance and fault monitoring, billing and accounting purposes. For example, the carrier core network 150 may be enabled to command the FGW 140 to allocate resources for a particular task such as delivering particular content to a desired standard handset such as the cell phone 120b. The command from the carrier core network 150 to the FGW 140 may comprise identifying information on the desired standard handset as well as a detected Femtocell device such as the Femtocell device 110. The architecture of the carrier core network 150 may be changed when new services and features may be introduced. The carrier core network 150 may communicate various services by managing connections between the service server 160 and desired standard handsets such as the cell phone 120b. In this regard, the carrier core network 150 may deliver various contents to the cell phone 120b from the service server 160 via the Femtocell device 110 and/or the standard base station 170.

The service server 160 may comprise suitable logic circuitry and/or code that may enable transmitting vast amounts of content of various types comprising voice, video, audio, text, or executable programs, to various standard handsets such as the cell phone 120b over the carrier core network 150.

The standard base station 170 may comprise suitable logic, circuitry and/or code that may enable scheduling of communication resources in an uplink direction and/or downlink direction to users of various standard handsets 120. The standard base station 170 may receive and/or transmit radio frequency signals from and/or to the standard handsets 120 in, for example, a UMTS radio network or a CDMA network.

In operation, the UMTS devices 120 may gain access to the carrier core network 150 via cellular communications with the standard base station 170 and/or various Femtocell devices such as the Femtocell 110. Various services from the service server 160 may be provided to users of the standard handsets 120 via the carrier core network 150. In instances that the carrier core network 150 may be configured to deliver a particular service to a desired standard handset such as the cell phone 120b via the Femtocell device 110, then content associated with the particular service may be routed to the Femtocell device 110 over the broadband IP network 130. The Femtocell device 110 may be enabled to adopt the content associated with the particular service based on corresponding user profile. The adopted content may be communicated with the cell phone 120b using a standard air interface protocol defined for a RAN associated with the cell phone 120b and the standard base station 170. In this regard, the Femtocell device 110 may be enabled to process the content associated with the particular service from the service server 160 to ensure the delivered service is presented properly at the cell phone 120b. User profile associated with the cell phone 120b may be evaluated by the Femtocell device 110 in order to format the content properly for the cell phone 120b. Based on the user profile of the cell phone 120b, the Femtocell device 110 may be enabled to determine and apply a security level and a security protocol for content protection, perform content transcoding, and/or adjust a content delivery bit rate to deliver content associated with the particular service to the cell phone 120b.

Figure 2:
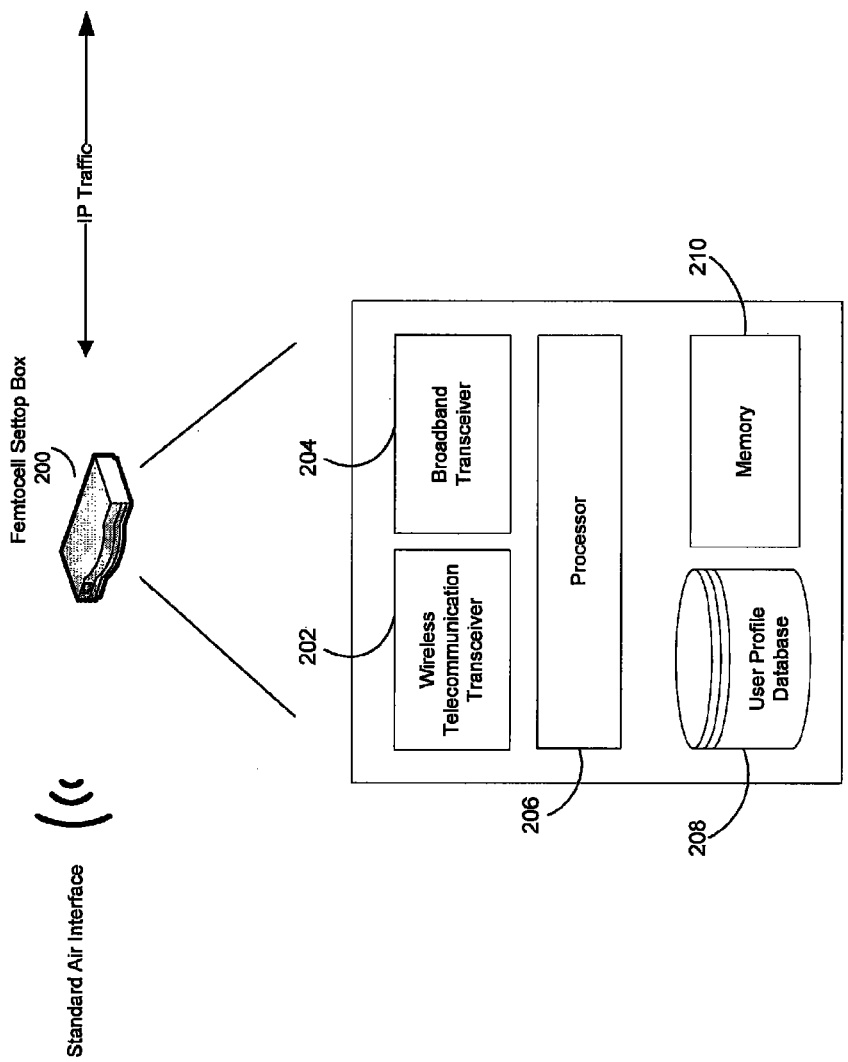
FIG. 2 is a diagram illustrating a Femtocell set-top box that is enabled to deliver content to a standard handset based on associated user profile, in accordance with an embodiment of the invention.

FIG. 2 is a diagram illustrating a Femtocell set-top box that is enabled to deliver content to a standard handset based on associated user profile, in accordance with an embodiment of the invention. Referring to FIG. 2, there is shown an exemplary Femtocell set-top box 200 comprising a wireless telecommunication transceiver 202, a broadband transceiver 204, a processor 206, a user profile database 208, and a memory 210.

The wireless telecommunication transceiver (WTT) 202 comprises suitable logic, circuitry and/or code that may be enabled to receive and/or transmit radio frequency signals from and/or to the standard handsets 120 via various standard air interface protocols such as, for example, UMTS, GSM, LTE, WiMAX, and/or other wireless network. The WTT transceivers 202 may be enabled to transmit and/or receive radio frequency (RF) signals, which may be communicated from/to the processor 204, using a standard radio frequency technology as described in LTE, for example.

The broadband transceiver 204 may comprise suitable logic, circuitry, and/or code that may be operable to transmit voice and/or data in adherence to one or more internet protocol (IP) broadband standard. The broadband transceiver 204 may be enabled to transmit and/or receive voice and/or data to and/or from the broadband IP network 130 over a T1/E1 line, DSL, cable television infrastructure, satellite broadband internet connection, satellite television infrastructure, and/or Ethernet.

The processor 206 may comprise suitable logic, circuitry and/or code that may be enabled to perform a variety of signal processing tasks and may comprise controlling of the WTT 202 as well as the broadband transceiver 204, for example. The processor 206 may be enabled to process various voice and/or data received via the broadband transceiver 204. The received various voice and/or data may comprise content associated with a particular service provided by the service server 160 over the broadband IP network 130. In this regard, the processor 206 may be enabled to reformat the received content associated with the particular service so the received content is suitable for presentation via a target standard handset such as the cell phone 120b.

A user profile of a particular handset served by the Femtocell device 110 may comprise a set of user related parameters such as, for example, user identity, QoS capability, security levels and security protocols supported, power consumption level, and/or subscriber device configuration information. The power consumption level may be referred to actual power consumption information at a target standard handset such as the cell phone 120b. The power consumption level may comprise information such as, for example, power consumption, power remaining, power available, processes running and their power consumption, past power usage, and/or predicted power usage at the cell phone 120b. The power consumption level of the cell phone 120b may indicate a desired transmission bit rate, a reduced transmission bit rate, a desired content coding structure, and/or a desired compression format for communicating content to the cell phone 120b. The desired transmission bit rate may be referred to the transmission bit rate required by corresponding QoS associated with content, which may be received by the Femtocell set-top box 200 from the broadband IP network 130, to the cell phone 120b. For example, a high power consumption level at the cell phone 120b may support a desired transmission bit rate for transmitting the received content from the Femtocell set-top box 200 to the cell phone 120b, while a low power consumption level at the cell phone 120*b* may result in transmitting the received content from the Femtocell set-top box 200 to the cell phone 120*b* at a reduced transmission bit rate. The processor 206 may be enabled to evaluate the user profile of, for example, the cell phone 120*b*, to filter services in order to provide to the user of the cell phone 120*b* particular services according, for example, to preference, associated context, power consumption level, and to various user security parameters such as, for example, security levels and security protocols supported. In this regard, upon receiving content from the broadband transceiver 204, the processor 206 may be enabled to identify a target handset from the received content and evaluate an associated user profile of the target handset. Based on the associated user profile of the target handset, the processor 206 may be enabled to determine a content security level and a security protocol to protect the received content from a hack attack, perform content transcoding to adapt the received content to the cell phone 120*b*, and/or adjust a transmission bit rate for delivering the received content to the cell phone 120*b*, accordingly. In another embodiment of the invention, the processor 206 may be enabled to adjust various content transmission parameters such as, for example, a resolution, a color depth, a frame rate, a compression level, sample rate, coding structure, compression format, and/or a desired transmission bit rate for the cell phone 120*b* based on the associated user profile. The cell phone 120*b* may be enabled to transmit captured content such as a video or a song to the Femtocell set-top box 200 using the adjusted content transmission parameters. For example, the processor 206 may be enabled to assign different coding structure or compression format such as, for example, a coding structure IIII, IPPP, and/or IBBPBBP, for content transmission from the cell phone 120*b* based on a power consumption level and/or a remaining battery life of the cell phone 120*b*. In addition, depending on the power consumption level and/or the remaining battery life of the cell phone 120*b*, a transmission bit rate assigned to the cell phone 120*b* may be adjusted by the Femtocell set-top box 200 for transmitting the captured contents from the cell phone 120*b* to the Femtocell set-top box 200.

The user profile database 208 may comprise suitable logic, circuitry and/or code that may enable storage of user profiles pertaining to the Femtocell device 110. The user profile database 208 may associate at least each served standard handset such as the cell phone 120*b* served with a particular user profile comprising a set of user specific parameters such as, for example, user identity, QoS capability, security levels and security protocols supported, power consumption level, and/or subscriber device configuration information. The user profile database 208 may be stored in RAM, ROM, low latency nonvolatile memory such as flash memory and/or other suitable electronic data storage capable of storing data and instructions.

The memory 210 may comprise suitable logic, circuitry and/or code that may enable storage of data and/or other information utilized by the processor 206. For example, the memory 210 may be utilized to store processed data generated by the processor 206. The memory 210 may be enabled to store executable instructions to process, for example, received content via the broadband IP transceiver 204. For example, various algorithms for content protection, content transcoding, and/or bit rate determination for content delivery to a target standard handset. Some software may be stored in the memory 210 and is utilized for communicating reformatted content with the target handset via a standard air interface. The memory 210 may comprise RAM, ROM, low latency nonvolatile memory such as flash memory and/or other suitable electronic data storage capable of storing data and instructions.

In operation, content associated with a particular service may be received via the broadband transceiver 204. The received content may be communicated with the processor 206 for further processing. The processor 206 may be enabled to identify one or more target handsets for the received content and then access the user profile database 208 to acquire one or more corresponding user profiles for the one or more identified target handsets. Based on the acquired user profile, the processor 206 may be configured to determine and apply a content security level and a security protocol to prevent the received content from a hack attack. The processor 206 may be enabled to reformat the received content by, for example, performing content transcoding based on the acquired user profile to adapt the received content to the one or more target handsets. Moreover, the processor 206 may be enabled to determine and/or adjust a transmission bit rate based on the corresponding acquired user profile for delivering the received content to the one or more target handsets. Various algorithms stored in the memory 210 may be utilized for processing the received contents by the processor 206 to deliver to a destination mobile device such as the cell phone 120*b*. Content received from the broadband IP network 130 may be processed in various ways. For example, a resolution, a color depth, a frame rate, a compression level, sample rate, coding structure, and/or compression format associated with the received content may be adjusted based on a determined security protocol and/or a security level of a target handset. Different coding structure or compression format such as, for example, a coding structure IIII, IPPP, and/or IBBPBBP, may result in different computation complexity and power consumption with signal processing inside the target handset. The processor 206 may be enabled to determine a coding structure such as III for content transmission to the target handset based on a power consumption level and/or a remaining battery life of the target handset.

Figure 3:
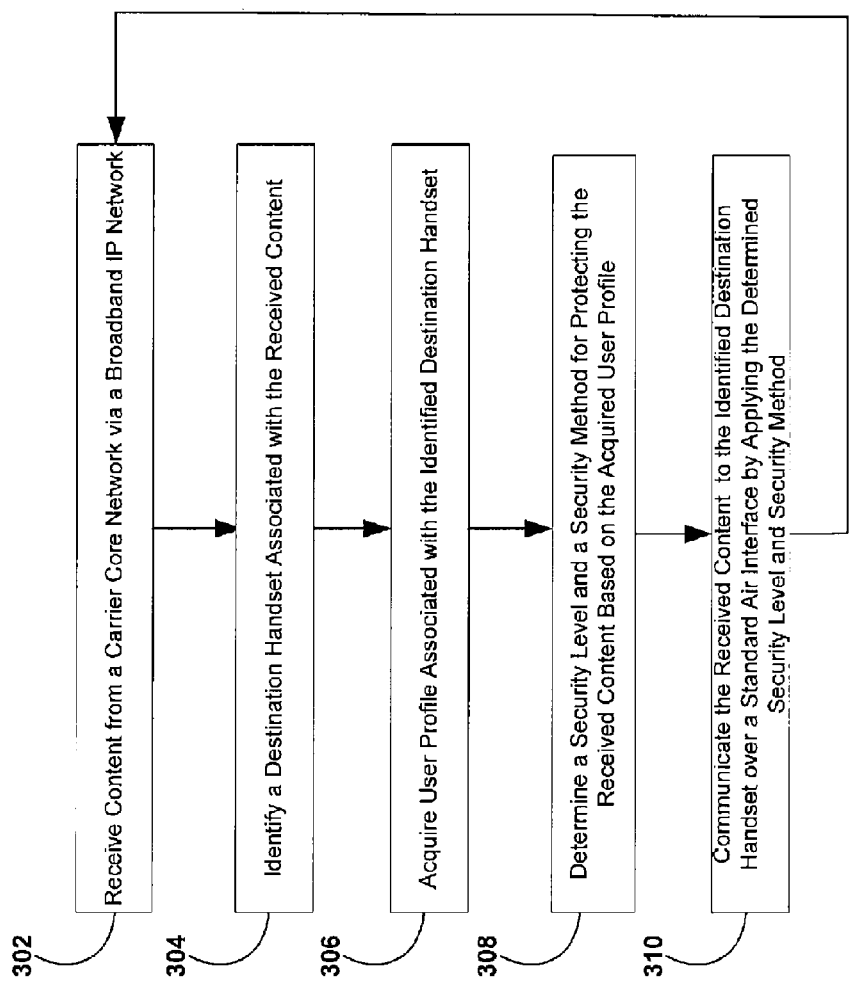
FIG. 3 is a flow chart illustrating an exemplary content protection procedure to deliver content to a standard handset via a Femtocell device, in accordance with an embodiment of the invention.

FIG. 3 is a flow chart illustrating an exemplary content protection procedure to deliver content to a standard handset via a Femtocell device, in accordance with an embodiment of the invention. Referring to FIG. 3, the exemplary steps start with the step 302, where a Femtocell device such as the Femtocell set-top box 200 may receive content via the broadband transceiver 204 and communicate the received content with the processor 206 for further processing. The content may be provided by the carrier core network 150 via a broadband IP network 130. In step 304, the processor 206 may be enabled to identify a destination handset for the received content. In step 306, the processor 206 may be enabled to communicate with the user profile database 208 to acquire user profile associated with the identified destination handset.

In step 308, the processor 206 may be enabled to determine a security level and a security protocol used for protecting the received content based on the acquired user profile. Content may be secured via various security levels such as file encryption and encryption schemes. A high security level may be assigned to higher quality content to be protected from, for example, being communicated over weakly secured RAN links. For example, in GSM, a ciphering algorithm negotiation at link level is not secured. High quality content with a high security level may be protected from active man-in-the-middle attacks. Various security protocols such as, for example, digital signatures, SSL, VPNs, and IPSec, may be used for secure content depending on corresponding user capability. For example, the acquired user profile may indicate that the destination handset for content received may support an IPSec protocol, the processor 206 may be enabled to communicate the received content with the destination handset using IPSec protocol. In step 310, the processor 206 may be enabled to apply the determined security level and security protocol to the received content. The received content may be communicated with the identified destination handset over a standard air Interface via the wireless telecommunication transceiver 202. The exemplary steps may return to the step 302.

Figure 4:
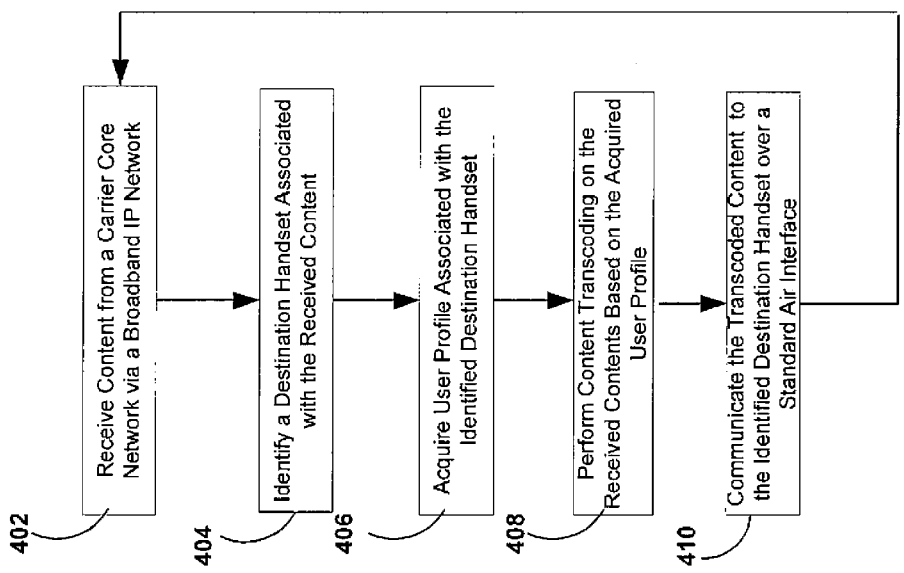
FIG. 4 is a flow chart illustrating a content transcoding procedure to deliver content to a standard handset via a Femtocell device, in accordance with an embodiment of the invention.

FIG. 4 is a flow chart illustrating a content transcoding procedure to deliver content to a standard handset via a Femtocell device, in accordance with an embodiment of the invention. Referring to FIG. 4, the exemplary steps start with the step 402, where a Femtocell device such as the Femtocell set-top box 200 may receive content via the broadband transceiver 204 and communicate the received content with the processor 206 for further processing. The content may be provided by the carrier core network 150 via a broadband IP network 130. In step 404, the processor 206 may be enabled to identify a destination handset for the received content. In step 406, the processor 206 may be enabled to communicate the user profile database 208 to acquire user profile associated with the identified destination handset. In step 408, the processor 206 may be enabled to perform content transcoding on the received contents based on the acquired user profile. In step 410, the processor 206 may be enabled to communicate the transcoded content to the identified destination handset over a standard air Interface via the wireless telecommunication transceiver 202. The exemplary steps may return to the step 402.

Figure 5:
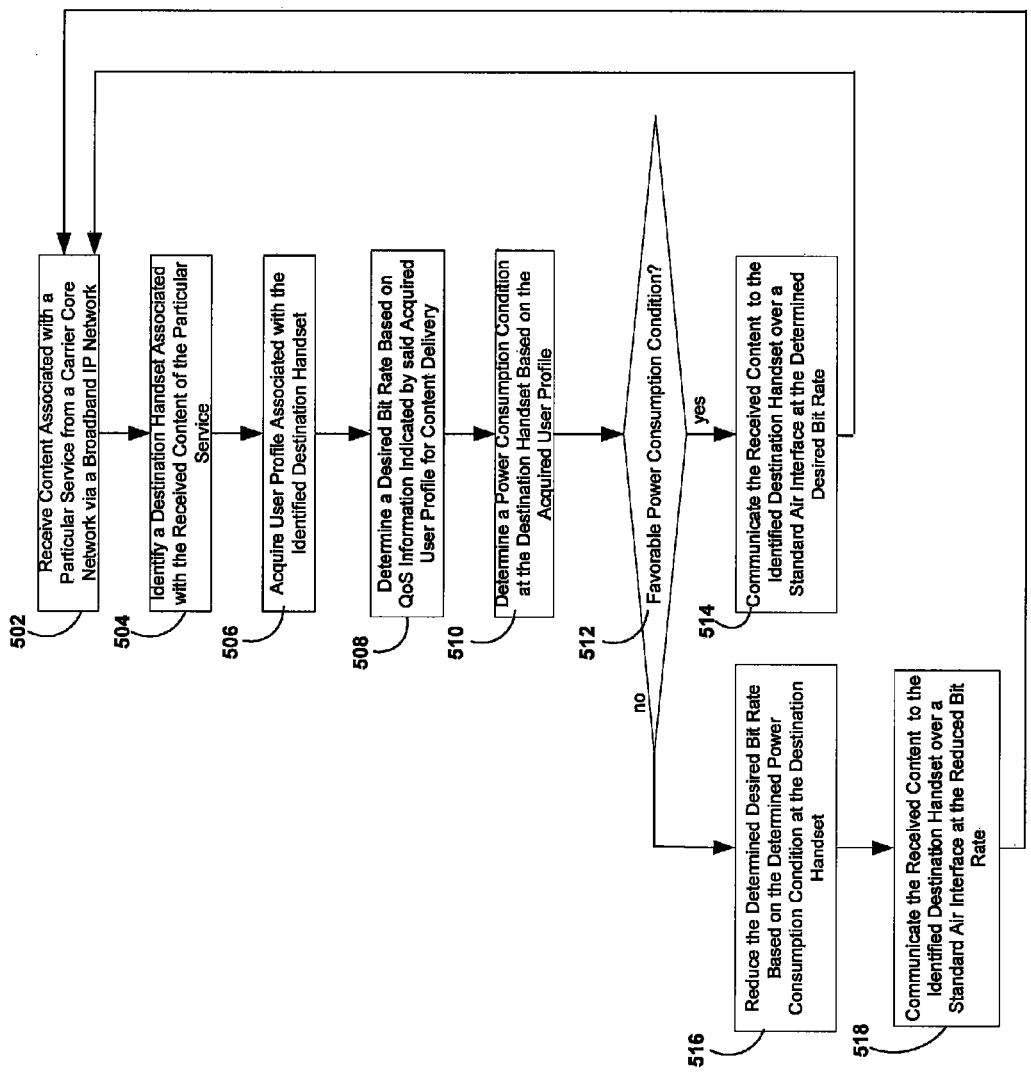
FIG. 5 is a flow chart illustrating an exemplary content rate adjustment procedure to deliver content to a standard handset via a Femtocell device, in accordance with an embodiment of the invention.

FIG. 5 is a flow chart illustrating an exemplary content rate adjustment procedure to deliver content to a standard handset via a Femtocell device, in accordance with an embodiment of the invention. Referring to FIG. 5, the exemplary steps start with the step 502, where a Femtocell device such as the Femtocell set-top box 200 may receive content via the broadband transceiver 204 and communicate the received content with the processor 206 for further processing. The content may be provided by the carrier core network 150 via a broadband IP network 130. In step 504, the processor 206 may be enabled to identify a destination handset for the received content. In step 506, the processor 206 may be enabled to communicate the user profile database 208 to acquire user profile associated with the identified destination handset. In step 508, the processor 206 may be enabled to determine a desired transmission bit rate based on associated QoS of the particular service for content delivery.

In step 510, the processor 206 may be enabled to determine a power consumption condition at the destination handset based on the acquired user profile. In step 512, the processor 206 may determine whether the power consumption condition is favorable at the destination handset. In instances where the power consumption condition is favorable at the destination handset, then in step 514, where the processor 206 may be enabled to communicate the received content to the identified destination handset over a standard air interface at the determined desired transmission bit rate. The exemplary steps may return to the step 502. In step 512, in instances where the power consumption condition is not favorable at the destination handset, then in step 516, where the processor 206 may be enabled to reduce the determined desired transmission bit rate based on the determined power consumption condition at the destination handset. In step 518, the processor 206 may be enabled to communicate the received content to the identified destination handset over a standard air interface at the reduced transmission bit rate. The exemplary steps may return to the step 402.

In various embodiments of the invention, the power consumption condition at the destination handset may be monitored in real time and as the power consumption condition changes, the data rate may be adjusted, for example, to save power in the destination handset. For example, the QoS of the content being delivered to the destination handset may be degraded to acceptable limits which may be indicated, for example, in the user profile for the handset or via real time user interaction via a user interface of the handset.

Figure 6:
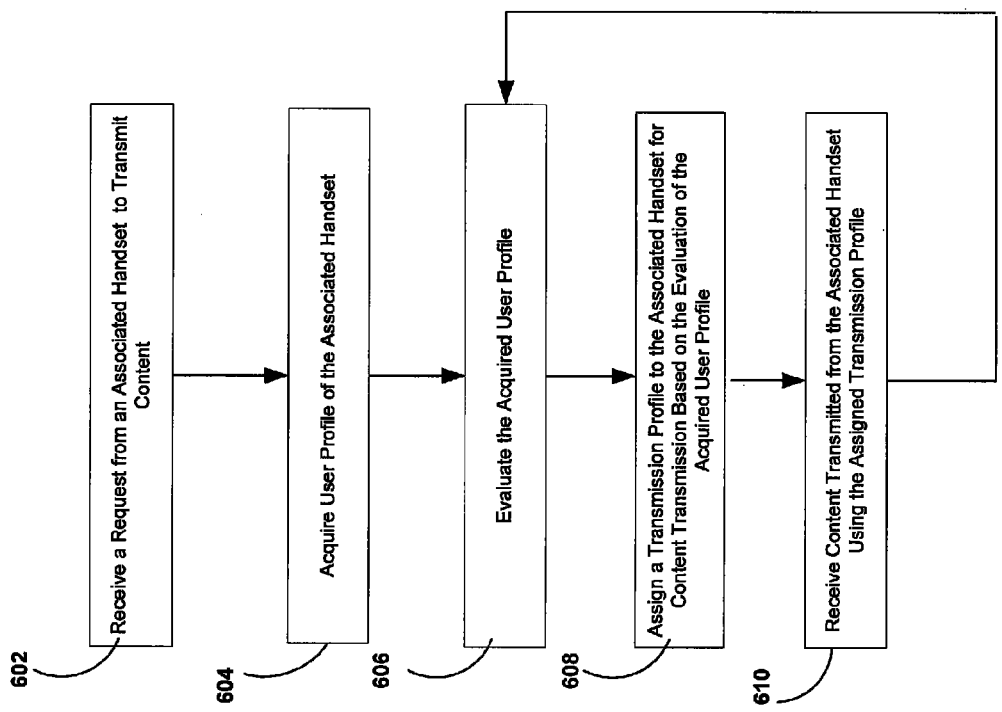
FIG. 6 is a flow chart illustrating an exemplary procedure for generating a transmission profile utilized by a standard handset to transmit content to a Femtocell device, in accordance with an embodiment of the invention.

FIG. 6 is a flow chart illustrating an exemplary procedure for generating a transmission profile utilized by a standard handset to transmit content to a Femtocell device, in accordance with an embodiment of the invention. Referring to FIG. 6, the exemplary steps start with the step 602, where a Femtocell device such as the Femtocell device 110 may be enabled to receive a request from an associated standard handset such as the cell phone 120b to transmit content to the Femtocell device 110. The content to be transmitted may be a video and/or a song captured by the cell phone 120b. In step 604, the Femtocell device 110 may be enabled to acquire a user profile of the cell phone 120b from, for example, the user profile database 208. In step 606, the Femtocell device 110 may be enabled to evaluate the acquired user profile in order to generate a transmission profile to be utilized by the cell phone 120b for transmitting the captured content to the Femtocell device 110. For example, the Femtocell device 110 may be operable to figure out, by evaluating the acquired user profile, various transmission parameters such as, for example, a security level, supported security protocol, a resolution, a color depth, a frame rate, a compression level, sample rate, coding structure, compression format, a power consumption level, and/or a remaining battery life, for the cell phone 120b. The Femtocell device 110 may be enabled to determine a transmission profile for the cell phone 120b to transmit content to the Femtocell device 110. In one embodiment of the invention, the user profile of the cell phone 120b may comprise device power consumption information such as a remaining battery life of the cell phone 120b and/or a required power consumption level required for a particular coding structure such as, for example, a coding structure IIII, IPPP, and/or IBBPBBP. In this regard, the Femtocell device 110 may be enabled to determine a coding structure to be utilized for transmitting content from the cell phone 120b to the Femtocell device 110 based on the device power consumption information of the cell phone 120b. In an alternate embodiment, the Femtocell device 110 may be enabled to adjust or update various transmission parameters such as, for example, a resolution, a color depth, a frame rate, a compression level, sample rate, coding structure, and/or compression format, during content transmission to the Femtocell device 110 from the cell phone 120b. In another embodiment of the invention, the user profile of the cell phone 120b may comprise the device power consumption information such as a power consumption level required for a particular transmission bit rate. In this regard, the Femtocell device 110 may be enabled to determine a transmission bit rate for transmitting content from the cell phone 120b to the Femtocell device 110 based on the required power consumption level and/or the remaining battery life of the cell phone 120b. In step 608, the Femtocell device 110 may be enabled to assign the determined transmission profile to the cell phone 120b based on the evaluation of the acquired user profile of the cell phone 120b. In step 610, the Femtocell device 110 may be enabled to receive content, which is transmitted by using the assigned transmission profile from the cell phone 120b. The exemplary process may return to step 606.

Aspects of a method and system for a user profile based content delivery between a standard handset and a Femtocell device are provided. In accordance with various embodiments of the invention, an access device such as the Femtocell device 110 may receive content from the broadband IP network 130. The received content may be associated with a particular service provided by the carrier core network 150. The Femtocell device 110 may be enabled to communicate the received content using a standard air interface protocol to a standard destination handset such as the cell phone 120b. The Femtocell device 110 may be configured to deliver the received content based on a user profile of the cell phone 120b. As described with respect to, for example FIG. 2 through FIG. 6, the processor 206 may be enabled to identify the cell phone 120b by, for example, decoding a destination ID parameter in packet headers of the received content. The processor 206 may be enabled to access the user profile database 208 to acquire the user profile of the cell phone 120b based on the decoded destination ID. Based on the acquired user profile of the cell phone 120b, the processor 206 may be enabled to determine a security level and/or a security protocol for content protection. The processor 206 may apply the determined security level and/or the determined security protocol to communicate the received content to the cell phone 120b.

The processor 206 may perform content transcoding on the received content based on the acquired user profile and communicate the transcoded content, for example, in a format of IIII, IPPP, or IBBPBBP, to the cell phone 120b. The transcoding may be done to ensure that the content is suitable for presentation by the cell phone 120b. Moreover, the processor 206 may be enabled to determine a desired transmission bit rate based on QoS capability information in the acquired user profile for communicating the received content to the cell phone 120b. Depending on power consumption condition indicated by the acquired user profile of the cell phone 120b, for example, in instances where power consumption condition at the cell phone 120b is favorable, the processor 206 may communicate the received content to the cell phone 120b at the determined desired transmission bit rate. In instances where the power consumption condition at the cell phone 120b is not favorable, the processor 206 may be configured to reduce the desired transmission bit rate and communicate the received content to the cell phone 120b at the reduced transmission bit rate over the standard air interface such as, for example, 3GPP, 3GPP2, and/or WiMAX.

In accordance with various embodiments of the invention, an access device such as the Femtocell device 110 may receive content from the broadband IP network 130. The received content may be associated with a particular service provided by the carrier core network 150 and need to be communicated with a wireless handset such as the cell phone 120b. The cell phone may be associated with a radio access network comprising the standard base station 170. The Femtocell device 110 may be enabled to acquire a user profile used in the associated radio network for the cell phone 120b. The Femtocell device 110 may be operable to determine a security level and/or a security protocol based on the acquired user profile. The acquired user profile may be utilized to communicate the received content from the Femtocell device 110 to the cell phone 120b via an air interface protocol utilized by the radio access network. As described with respect to, for example FIG. 2 through FIG. 6, the processor 206 may be enabled to identify the cell phone 120b by, for example, decoding a destination ID parameter in packet headers of the received content.

The processor 206 may be enabled to acquire the user profile of the cell phone 120b based on the identified mobile device such as the cell phone 120b. Based on the acquired user profile of the cell phone 120b, the processor 206 may be enabled to determine a security level and/or a security protocol for content protection. The processor 206 may perform content transcoding on the received content based on the acquired user profile to ensure that the content is suitable for presentation by the cell phone 120b. Various aspects of the received content may be adjusted via transcoding based on the acquired user profile. For example, a resolution, a color depth, a frame rate, a compression level, and sample rate of the received content may be adjusted based on the determined security protocol and/or the determined security level. The transcoded received content may be communicated, for example, in a format of IIII, IPPP, or IBBPBBP, to the cell phone 120b using the determined security methods and/or the determined security level. Moreover, the acquired user profile may comprise a terminal power report from associated wireless devices served. The terminal power report may comprise power consumption, power remaining, power available, processes running and their power consumption, past power usage, and/or predicted power usage at the cell phone 120b. The power consumption condition at the cell phone 120b may indicate a desired transmission bit rate and/or a reduced transmission bit rate for communicating the received content to cell phone 120b. The processor 206 may be enabled to determine whether the desired transmission bit rate, the reduced transmission bit rate, or other parameters may be utilized for content delivery to the cell phone 120b based on the power consumption, remaining and/or available power at the cell phone 120b. The cell phone 120b and the standard base station 170 may be associated with various radio access networks defined in 3GPP, 3GPP2, and/or WiMAX, for example.

In accordance with various embodiments of the invention, the Femtocell device 110 may be enabled to receive content from a wireless handset such as the cell phone 120b. The content may be a video or a song captured by the cell phone 120b. In this regard, the Femtocell device 110 may be enabled to evaluate corresponding user profile of the cell phone 120b to determine a transmission profile for content transmission from the cell phone 120b to the Femtocell device 110. The determined transmission profile may comprise a transmission bit rate and/or a coding structure such as IIII, IPPP, or IBBPBBP.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a user profile based content delivery between a standard handset and a Femtocell device.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, comprising:
   receiving, by an access device, content from a broadband IP network to be communicated to a wireless handset associated with a radio access network;
   acquiring, by said access device, a user profile used in said radio access network for said wireless handset; and
   communicating said received content from said access device to said wireless handset utilizing an air interface protocol utilized by said radio access network, wherein a security feature utilized for said communicating is determined based on said acquired user profile,
   wherein said user includes information that indicates at least one of a desired transmission bit rate and a reduced transmission bit rate for said communicating said received content to said wireless handset.

2. The method according to claim 1, comprising identifying said wireless handset based on information in said received content.

3. The method according to claim 2, comprising acquiring said user profile based on said information in said received content.

4. The method according to claim 3, comprising determining a security level and/or a security protocol based on said acquired user profile.

5. The method according to claim 3, comprising transcoding said received content based on said acquired user profile.

6. The method according to claim 5, comprising adjusting during said transcoding, one or more of a resolution, a color depth, a frame rate, a compression level, and a sample rate of said received content based on a determined security protocol and/or a determined security level.

7. The method according to claim 5, comprising communicating said transcoded content to said wireless handset using a determined security protocol and/or a determined security protocol.

8. The method according to claim 5, wherein said transcoded content is in a format of IIII, IPPP, or IBBPBBP.

9. The method according to claim 1, comprising determining whether to utilize said desired transmission bit rate or said reduced transmission bit rate based on power consumption and/or remaining power of said wireless handset.

10. The method according to claim 1, comprising:
    determining a transmission profile based on said acquired user profile; and
    receiving content from said wireless handset using said determined transmission profile.

11. The method according to claim 10, wherein said determined transmission profile comprises a transmission bit rate and/or a coding structure.

12. The method according to claim 11, wherein said coding structure is IIII, IPPP, or IBBPBBP.

13. The method according to claim 1, wherein the security feature is a security level or a security protocol.

14. A system for communication, comprising:
    one or more circuits for use in an access device, wherein said one or more circuits are configured to receive content from a broadband IP network to be communicated to a wireless handset associated with a radio access network;
    said one or more circuits are configured to acquire a user profile used in said radio access network for said wireless handset; and
    said one or more circuits are configured to communicate said received content from said access device to said wireless handset utilizing an air interface protocol utilized by said radio access network, wherein a security feature utilized for said communicating is determined based on said acquired user profile,
    wherein said user profile includes information that indicates at least one of a desired transmission bit rate and a reduced transmission bit rate to communicate said received content to said wireless handset.

15. The system according to claim 14, wherein said one or more circuits are configured to identify said wireless handset based on information in said received content.

16. The system according to claim 15, wherein said one or more circuits are configured to acquire said user profile based on said information in said received content.

17. The system according to claim 16, wherein said one or more circuits are configured to determine a security level and/or a security protocol based on said acquired user profile.

18. The system according to claim 16, wherein said one or more circuits are configured to transcode said received content based on said acquired user profile.

19. The system according to claim 18, wherein said one or more circuits are configured to adjust, during said transcoding, one or more of a resolution, a color depth, a frame rate, a compression level, and a sample rate of said received content based on a determined security protocol and/or a determined security level.

20. The system according to claim 18, wherein said one or more circuits are configured to communicate said transcoded content to said wireless handset using a determined security protocol and/or a determined security protocol.

21. The method according to claim 18, wherein said transcoded content is in a format of IIII, IPPP, or IBBPBBP.

22. The system according to claim 14, wherein said one or more circuits are configured to determine whether to utilize said desired transmission bit rate or said reduced transmission bit rate based on power consumption and/or remaining power of said wireless handset.

23. The system according to claim 14, wherein said one or more circuits are configured to determine a transmission profile based on said user profile; and
    receive content from said wireless handset using said determined transmission profile.

24. The system according to claim 23, wherein said transmission profile comprises a transmission bit rate and/or a coding structure.

25. The system according to claim 24, wherein said coding structure is IIII, IPPP, or IBBPBBP.

26. The system according to claim 14, wherein the security feature is a security level or a security protocol.

27. A system for communication, comprising:
- one or more circuits for use in an access device, wherein said one or more circuits are configured to receive content from a broadband IP network to be communicated to a wireless handset associated with a radio access network;
- said one or more circuits are configured to acquire a user profile used in said radio access network for said wireless handset;
- said one or more circuits are configured to communicate said received content from said access device to said wireless handset utilizing an air interface protocol utilized by said radio access network, wherein a security feature utilized for said communicating is determined based on said acquired user profile;
- said one or more circuits are configured to determine a transmission profile based on said user profile, wherein said transmission profile comprises a transmission bit rate and/or a coding structure; and
- said one or more circuits are configured to receive content from said wireless handset using said determined transmission profile.

* * * * *

UNITED STATES PATENT AND TRADEMARK OFFICE
CERTIFICATE OF CORRECTION

PATENT NO. : 8,478,236 B2  
APPLICATION NO. : 12/355598  
DATED : July 2, 2013  
INVENTOR(S) : Chen et al.

Page 1 of 1

It is certified that error appears in the above-identified patent and that said Letters Patent is hereby corrected as shown below:

In the Claims

Column 13, Line 33, Claim 1, replace "user includes" with --user profile includes--.

Signed and Sealed this
First Day of October, 2013

Teresa Stanek Rea
*Deputy Director of the United States Patent and Trademark Office*